Dec. 10, 1968  G. BOGNER  3,416,111
SUPERCONDUCTIVE SPOOL WITH REFRIGERANT-HOLDING
SPOOL CARRIER
Filed Sept. 9, 1966  4 Sheets-Sheet 1

Dec. 10, 1968          G. BOGNER          3,416,111
SUPERCONDUCTIVE SPOOL WITH REFRIGERANT-HOLDING
SPOOL CARRIER
Filed Sept. 9, 1966                                  4 Sheets-Sheet 2

Dec. 10, 1968  G. BOGNER  3,416,111
SUPERCONDUCTIVE SPOOL WITH REFRIGERANT-HOLDING
SPOOL CARRIER
Filed Sept. 9, 1966  4 Sheets-Sheet 3

United States Patent Office 3,416,111
Patented Dec. 10, 1968

3,416,111
SUPERCONDUCTIVE SPOOL WITH REFRIGERANT-HOLDING SPOOL CARRIER
Gunther Bogner, Erlangen, Germany, assignor to Siemens Aktiengesellschaft, a corporation of Germany
Filed Sept. 9, 1966, Ser. No. 578,393
Claims priority, application Germany, Sept. 11, 1965, S 99,383
18 Claims. (Cl. 336—60)

ABSTRACT OF THE DISCLOSURE

Superconductive spool includes several winding layers coextensively wound on a spool carrier adjacent each other, each having a pair of opposed outer windings and several intermediate windings. The spool carrier has a pair of opposed outer walls facing the outer windings, at least one of which is spaced therefrom by several spacer bodies in turn spaced circumferentially from one another. A heat-conducting foil is located between adjacent winding layers in heat-conductive contact with at least one of the layers and has tabs extending into the space between the spacers for engagement with a refrigerant received therein.

---

My invention relates to superconductive spools.

Superconductive spools can be used in particular to provide intense magnetic fields. Superconductive spools with windings composed of relatively long lengths of wire have for a magnetic field of given intensity a smaller critical current than short wire specimens in a magnetic field of the same intensity. As a result these spools with the windings of relatively long wires will have a transition to the normal conducting state at a smaller current intensity than a short wire specimen in a magnetic field of the same intensity. This effect is known as current degradation, and the current degradation increases the amount of superconducting material required to achieve a magnetic field of given intensity so that there is a resulting noticeable increase in the cost of such superconductive magnets. This effect results primarily from the poor dissipation of the heat which develops during excitation of the windings. As a result, the superconductor can be heated at localized portions thereof to temperatures above the critical temperature so as to experience a transition to the normal conducting state, with resulting premature collapse of the superconducting current.

The degradation effect can be reduced by encasing the superconductor of the winding in a metal of good conductivity which remains normally conducting during operation of the spool, this metal being, for example, copper, silver or gold. A further reduction of the degradation effect can be achieved by surrounding the individual winding layers with a foil of good heat conductivity. preferably made of a metal of high purity, such as, for example, copper, silver or aluminum, this foil being in heat-conducting relation with the winding layers of the spool and with the refrigerating medium required to cool the spool down to the cryostatic temperatures. Foils of this type achieve a good dissipation of the heat from the windings of the superconductive spool without undesirably increasing the volume required to accommodate a given number of windings of the spool, this relationship between a given unit of volume and the number of windings located therein being known as the packing factor. In order to achieve a good thermal contact between the foil and the refrigerating medium it is essential that the heat-conducting foil be wider than the winding layers of this spool, so that the foil necessarily projects laterally beyond the spool windings. When the foil projects laterally along its entire periphery beyond the body of windings, the spool windings no longer engage the walls of the spool carrier so that they are no longer laterally supported thereby. Therefore, the simple winding procedures which are used with spools having stable lateral limiting walls cannot be used with spools of this construction.

There is, therefore, a need for a spool construction where the spool windings are supported by stable, lateral limiting means while at the same time a good cooling of the windings can be achieved by cooling foils.

It is, therefore, a primary object of my invention to fill this latter need.

Thus, it is an object of my invention to provide a spool fulfilling this latter need while at the same time having a superconducting winding and a foil of good heat conductivity situated between winding layers and being in thermally conductive connection with the winding layers as well as with the refrigerating medium.

A further object of my invention is to provide a spool which possesses the above advantages while at the same time having a body of windings which can be simply and quickly manufactured.

In particular, it is an object of my invention to provide a spool which lends itself to winding procedures which can be performed by machines.

Furthermore, it is an object of my invention to provide a spool which will have a body of windings which will remain stable and unchanged during operation of the spool. This latter stability of the windings is of particular importance for the capacity of a superconducting spool, since, for example, loose windings can result in additional current degradation and training effects.

In addition, it is an object of my invention to provide a spool capable of absorbing the forces which act on the body of windings thereof, so that the spool of my invention will have a robust and stable construction.

The objects of my invention also include the provision of a spool which will have a good inner cooling of the body of windings without any appreciable reduction in the packing factor.

Moreover, it is an object of my invention to provide a construction which enables the above advantages to be applied to spools of widely differing forms.

Also, it is an object of my invention to provide a spool which will be uniformly cooled throughout all of its parts.

The objects of my invention also include the provision of a construction which enables the cooling foils to be easily introduced between adjoining layers of spool windings.

Primarily, the superconductive spool of my invention includes a plurality of winding layers which are substantially coextensive and situated adjacent each other with each layer having a pair of opposed outer windings and a plurality of intermediate windings situated between the opposed outer windings thereof. A spool carrier carries the winding layers and has a pair of opposed outer walls respectively having inner surfaces facing the opposed outer windings of the several winding layers. At least one of these opposed outer walls of the spool carrier is spaced from the winding layers, and a plurality of spacer bodies are situated in the space between this one outer wall of the spool carrier and the winding layers, these spacer bodies being spaced from each other and distributed along the winding layers to define between themselves spaces extending between the winding layers and the said one outer wall of the spool carrier and separated from each other by the spacer bodies. At least one heat-conducting foil is situated between a pair of adjoining winding layers in thermally conducting relation with at least one of the pair of adjoining winding layers, and this foil has a plurality of tabs respectively projecting into the spaces between the spacer bodies to engage a refrigerating medium situated therein during operation of the spool, so that in this way the foil will at least partly cool the spool.

My invention is illustrated by way of example in the accompanying drawings which form part of this application and in which.

Figure 1:
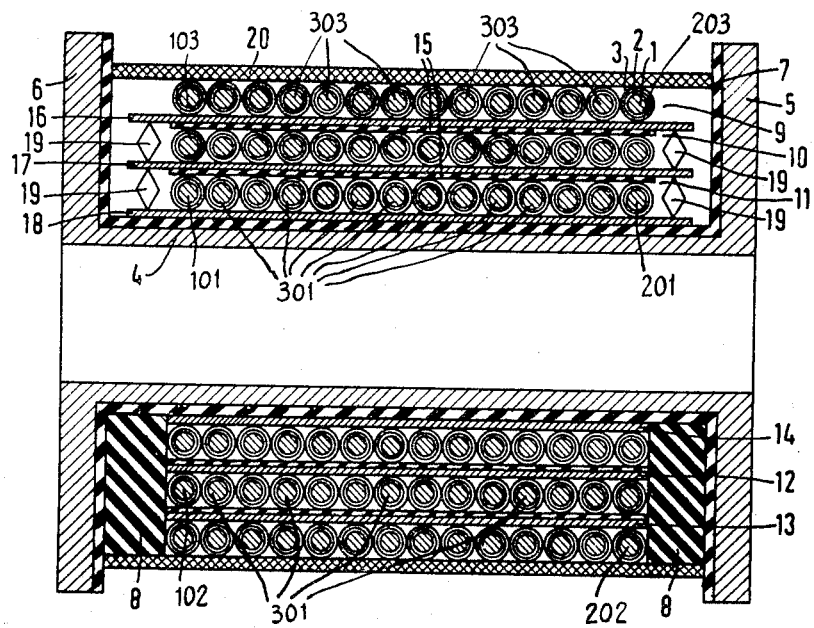
FIG. 1 is a longitudinal sectional elevation schematically illustrating one possible embodiment of a cylindrical spool according to my invention, the section of FIG. 1 being taken in a plane which contains the axis of the spool.

The winding of the cylindrical spool which is illustrated in FIG. 1 is made up of a superconductive wire 1 which is encased within a metal coating 2 of normal conducting metal with the latter metal coating in turn surrounded by an insulating layer 3. This winding is carried by a spool-carrier having an inner tubular wall 4 and a pair of opposed outer walls 5 and 6 which are of ring-shaped configuration and which are in the form of spool flanges projecting radially from the ends of the inner tubular wall 4. This spool carrier which is made of metal is insulated with respect to the windings by a layer of insulating foil 7. It will be noted that the several winding layers are substantially coextensive and situated adjacent each other with each cylindrical winding layer of FIG. 1 having a respective pair of opposed outer windings 101, 201; 102, 202, and 103, 203 between which intermediate windings 301, 302 and 303 respectively, are located. The outer walls 5 and 6 of the spool carrier have inner surfaces which are directed toward the opposed outer windings of the individual winding layers. These inner surfaces of the outer walls 5 and 6 are spaced from the winding layers, and in order to provide stable lateral limits for the winding layers spacer bodies 8 of rigid insulating material are situated in the spaces between the inner surfaces of the opposed outer walls 5 and 6 of the spool carrier and the outer opposed windings of the several winding layers, as indicated at the lower part of FIG. 1 where the section passes through a pair of the spacer bodies 8. At the upper part of FIG. 1 the section does not pass through a pair of spacer bodies 8 so that the spacer bodies do not appear at the upper part of FIG. 1. These spacer bodies 8 are circumferentially distributed along the winding layers and are spaced from each other to define between themselves spaces such as those shown at the upper part of FIG. 1 extending between the winding layers and the opposed outer end walls of the spool carrier.

Between the individual winding layers 9, 10 and 11 are located foils 12 and 13 of good heat conductivity. A further foil 14 is situated between the insulating foil of the spool carrier and the innermost winding layer 11. These foils 12–14 are in the form of closed cylinders. A pair of thin insulating foils 15 are respectively situated against the foils 12 and 13 for respectively insulating them from layers 11 and 10. Thus, it will be seen that each of the foils 12 and 13 is situated between a pair of adjoining winding layers and is insulated from only one of these layers by the thin insulating foil 15.

The spacer bodies 8 at each end of the winding layers are uniformly distributed circumferentially along the spool carrier. Thus, the spaces between the circumferentially distributed spacer bodies 8 are of a uniform size, and the several foils 12–14 respectively have tabs at their outer sides projecting into the spaces between the spacer bodies 8. Thus, the upper part of FIG. 1 where a pair of these spaces are visible, it will be seen that the foil 13 has tabs 16 projecting into the spaces between the bodies 8, the foil 12 has tabs 17 projecting into these spaces, respectively, and the foil 14 has tabs 18 projecting into these spaces. During operation of the spool, the spaces between the bodies 8 are filled with the refrigerating medium. The length of the tabs is less than the thickness of the spacer bodies 8. Therefore, the refrigerating medium has access to all of the tabs. In each of the spaces between a pair of successive spacer bodies 8, there are situated between the tabs of the several foils spacer elements 19 of insulating material, so that the several tabs which are situated in any one space between a pair of successive spacer bodies 8 are insulated from each other by these spacer elements 19 of insulating material. Thus, the spacer elements 19 will prevent the tabs in any one space from engaging each other. A steel mesh 20 surrounds the body of winding layers and foils and protects them against mechanical damage. Through this mesh the refrigerating medium will have access to all of the spaces between the spacer bodies. The outer walls 5 and 6 of the spool carrier may be provided with unillustrated openings through which the superconductor 1 can pass for the purpose of being connected with a source of current or being connected with parallel-connected resistances.

Figure 2:
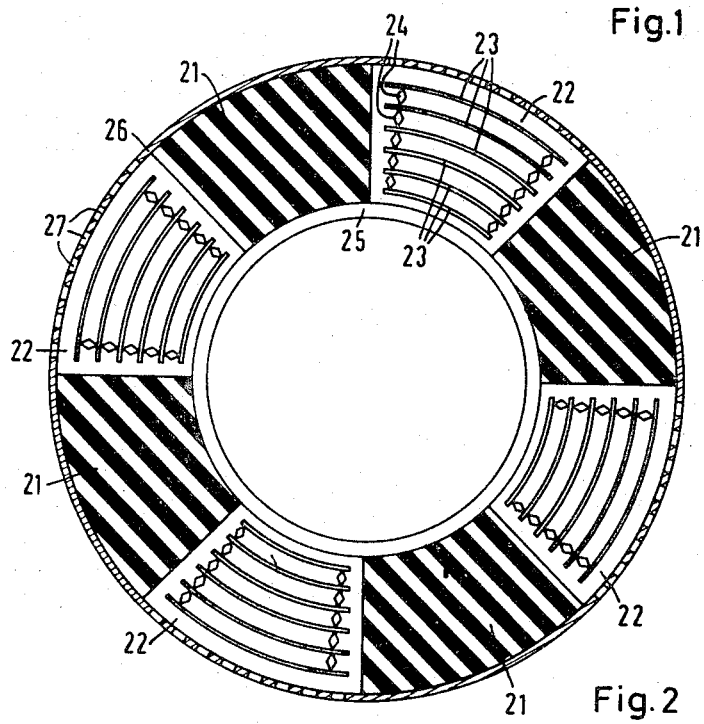
FIG. 2 is a schematic transverse section of another embodiment of a cylindrical spool according to my invention, the plane of the section of FIG. 2 being normal to the axis of the cylindrical spool.

FIG. 2 shows an embodiment of a cylindrical spool according to my invention in a transverse section taken in a plane which is normal to the axis of the cylindrical spool. In order to provide a clear illustration of the spacer bodies and the foil tabs which project into the spaces between these bodies, the ring-shaped outer wall at one end of this spool has been eliminated from FIG. 2. The spacer bodies 21 shown in FIG. 2 are uniformly distributed circumferentially about the spool axis along the outer windings of the several winding layers, and these spacer bodies 21 are made of a rigid insulating material and have the configuration of sectors of a circle. In the spaces 22 which are defined between the spacer bodies 21 are located the foil tabs 23 which project into these spaces from the cooling foils which are situated between the successive winding layers. The several tabs 23 situated in any one space 22 are separated from each other by spacer elements 24 of insulating material. The spool carrier includes an inner tubular wall 25 shown in FIG. 2 engaging the inner surfaces of the spacer bodies 21.

When using for a spool of my invention sector-shaped spacer bodies 21 as shown in FIG. 2, the cooling foils are introduced into the assembly by initially turning the projecting tabs thereof upwardly through 90 degrees so that they will clear the projecting bodies when the foils are placed around the individual winding layers between the two sets of spacer bodies situated next to the opposed outer walls of the spool carrier. Then, when the foils have been placed around the individual winding layers their tabs are turned back down so as to become situated in the spaces between the several spacer bodies. These cooling foils can be made up of a pair of components which overlap in the body of windings. Where each cooling foil is composed of such a pair of cooling foil components, it is not necessary to turn the tabs thereof during assembly of the spool. Instead the foils can be placed around a given winding layer overlapping each other at each layer to an extent greater than in their final condition, and once the overlapping foil components of one foil have been placed around a given winding layer they can be shifted apart from each other to reduce the extent to which they overlap so that the projecting tabs will in this way be moved into the spaces between the several spacer bodies. The particular embodiment of my invention which is shown in FIG. 2 has the distinct advantage of being exceedingly simple because of the sector-shaped spacer bodies 21. In order to protect the foil tabs 23, a metal ring or band 26 is situated around the spacer bodies and in the regions of the spaces 22 between these bodies the band 26 is formed with openings 27 through which the refrigerating medium can communicate with the spaces between the spacer bodies 21.

If the spacer bodies are not of sector-shaped configuration but instead are each provided with end surfaces which are of arcuate configuration and define the limits of the spaces between the spacer bodies, then it becomes very easy to directly introduce the cooling foils together with their tabs into the assembly without requiring any bending of the foil tabs. Embodiments of cylindrical spools according to my invention having spacer bodies of such construction are illustrated in FIGS. 3 and 4 also in transverse sections taken in planes normal to the spool axis with the outer end wall of the spool omitted so as to better illustrate the construction.

Figure 3:
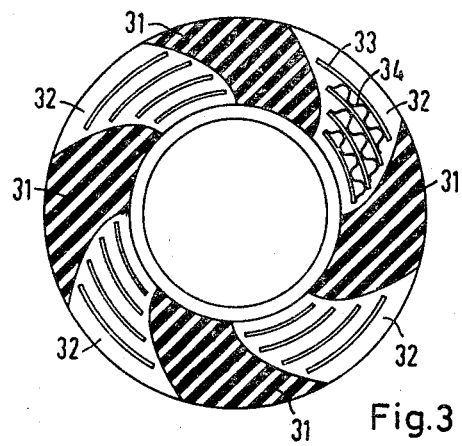
FIG. 3 is a schematic illustration in transverse section of a further embodiment of a cylindrical spool according to my invention, the section of FIG. 3 also being taken in a plane which is normal to the axis of the spool.

In the embodiment of FIG. 3 the end surfaces of each spacer body 31, these end surfaces limiting the spaces 32 defined between the spacer bodies 31, have the configuration of involutes of the circle of smallest radius along which the innermost winding layer of smallest radius extends. FIG. 3 shows the several cooling foil tabs 33 extending into the spaces 32, and the several tabs 33 in any one space 32 are maintained separate from each other by corrugated plastic insulating foils 34 which form the insulated spacer elements of this embodiment for maintaining the foil tabs separate from each other.

Figure 4:
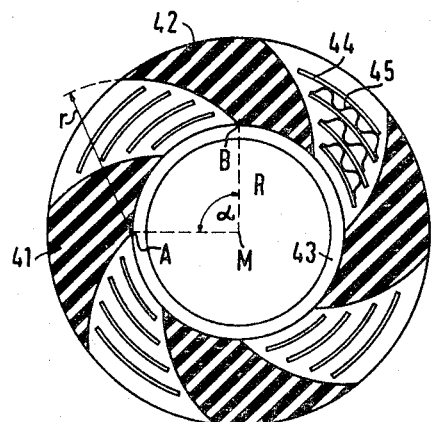
FIG. 4 is a schematic transverse section of yet another embodiment of a cylindrical spool according to my invention, the section of FIG. 4 also being taken in a plane normal to the spool axis.

In the embodiment of my invention which is illustrated in FIG. 4 the limiting end surfaces of the several spacer bodies 42, which thus define the spaces between the spacer bodies, extend in cross section along arcs of a circle. The radius of curvature of these circles is equal to the distance between a point A where one end of one spacer body engages the inner tubular wall 43 of this spool carrier and the point B where the corresponding inner edge at the end of the next spacer body engages the inner tubular wall 43 of this spool carrier. Thus, in FIG. 4 it will be seen that the successive spacer bodies 41 and 42 have at their corresponding inner edges the contact points A and B, respectively, situated from each other a distance equal to the radius of curvature of the limiting end surface of the body 42 which is directed toward the body 41. In the same way all of the successive spacer bodies have their limiting end surfaces extending in cross section along the arcs of circles. Of course, these contact points A and B may engage an insulating layer which surrounds the wall 43 instead of directly engaging the wall 43. Thus, the center of curvature of the limiting surfaces of the spacer bodies is situated at the inner tubular wall 43 of the spool carrier. The radius of curvature $r$ can be calculated according to the formula $$r = 2R \times \sin \frac{\alpha}{2}$$

where R is equal to the outer radius of the tubular wall 43 of the spool carrier and $\alpha$ is the angle between the radii extending from the points A and B to the center M of the circle of radius R. When the spacer bodies are provided with limiting end surfaces of the circular configuration, in cross section, shown in FIG. 4, these end surfaces will have a good approximation to the involute forms of FIG. 3. However, the circular forms of FIG. 4 have the advantage of being manufactured in a much simpler manner than the involute forms. In FIG. 4 the cooling foil tabs 44 are shown extending into the spaces between the several spacer bodies with these cooling foil tabs 44 maintained separate from each other and out of contact with each other by the corrugated spacer elements 45 made of plastic insulating material in the same way of the spacer elements 34.

Figure 5:
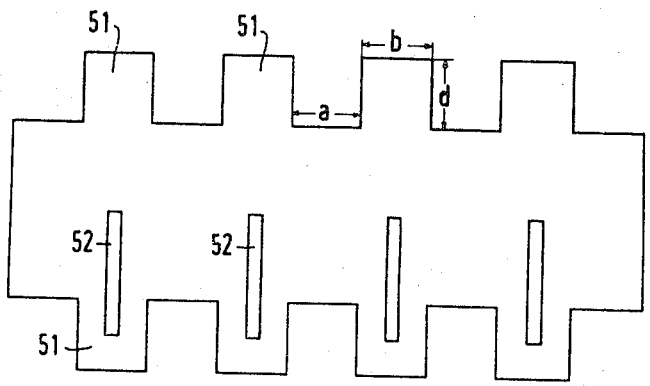
FIG. 5 illustrates the configuration of a heat-conducting foil of my invention.

Referring now to FIG. 5, the configuration of a cooling foil according to my invention is illustrated therein. This cooling foil has in the illustrated example projecting tabs 51 of rectangular configuration, and when the foil of FIG. 5 is assembled with the remainder of the spool extending around a winding layer thereof these tabs 51 extend outwardly beyond the opposed outer windings of the layers into the spaces between the spacer bodies. In the case of cylindrical spools, the foils are preferably given a configuration where the distance $a$ between successive tabs 51 as well as the width $b$ of the several tabs 51 become successively greater as the regions of the spools where the foils are located become of a greater diameter. Thus, the outermost foil of a cylindrical spool of my invention will have the dimensions $a$ and $b$ for each tab 51 which is a maximum for all of the foils of the spool, and these dimensions will become progressively smaller for the several foils which are situated progressively closer to the innermost winding layer. As a result of this arrangement the area of contact between the tabs of the cooling foils and the refrigerating liquid will have a constant ratio with respect to the exterior surface of the winding layer which is to be cooled. The dimensions $a$ and $b$, as well as the length $d$ of each tab 51 are given sizes which will enable the tabs to be easily introduced into the spaces between the spacer bodies while at the same time assuring a good access of the refrigerating medium to all of the tabs. The foil which is shown in FIG. 5 is provided on one side with the elongated slots 52 of rectangular configuration. These slots extend from the tabs 51 at one side of the foil up to a point situated substantially midway between the opposed side edges from which the tabs 51 project. Thus, these slots 52 will extend from the tabs at one side of the foil transversely across the winding layer next to the foil up to a point situated substantially midway between the opposed outer windings of the winding layer, and through these slots it is possible for the refrigerating medium to have access to the interior of the body of windings.

Figure 6:
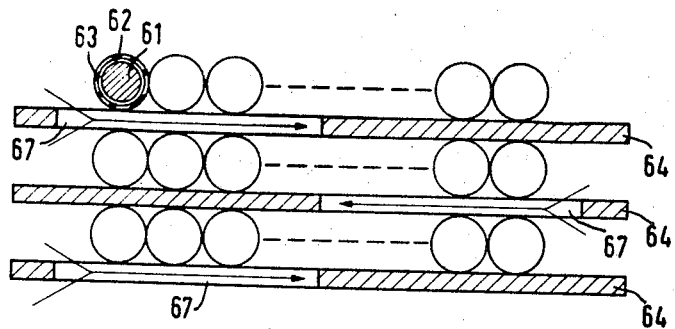
FIG. 6 is a schematic representation in section of one part of a spool winding according to one embodiment of a spool of my invention.
Figure 7:
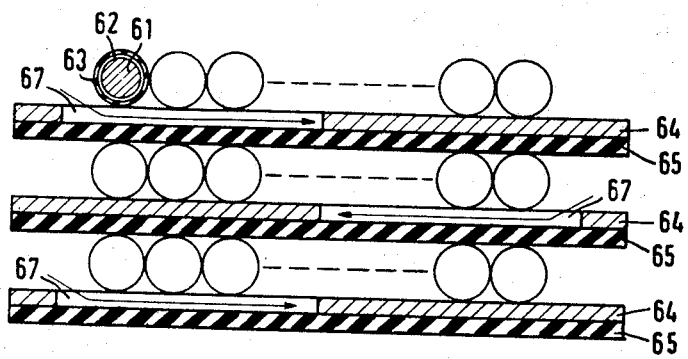
FIG. 7 is a schematic representation in section of a part of a spool winding of another embodiment of a spool according to my invention.
Figure 8:
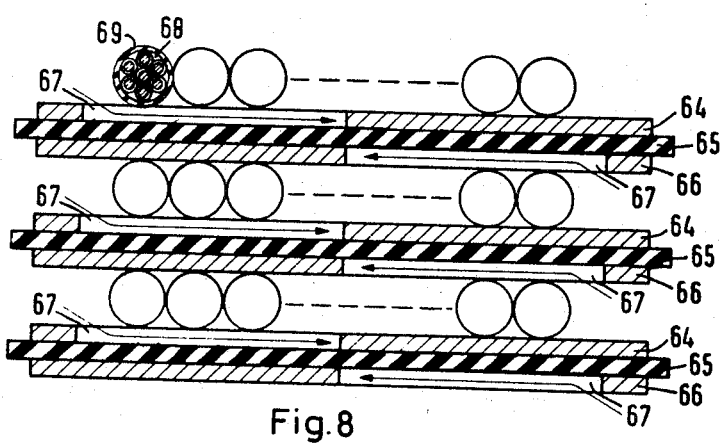
FIG. 8 is a schematic representation in section of a part of a spool winding of yet another embodiment of a spool according to my invention.

FIGS. 6–8 which respectively show schematically in section the different possible embodiments of spools according to my invention respectively illustrate different possible ways to insulate the cooling foils with respect to the winding layers. In FIGS. 6 and 7 the winding layers are composed of superconductive wires 61 encased within a normally conductive metal coating 62 which is in turn enveloped by an insulating layer 63. In FIG. 8, however, the superconductor is made up of a plurality of metal-encased wires which form a cable 68 which is surrounded by the insulating layer 69.

In the case where the insulation of the individual conductors is capable of withstanding the maximum potential encountered between a pair of winding layers, the cooling foils 64, as shown in FIG. 6, can be introduced between adjoining winding layers without any additional insulation. The cooling foils 64 in this embodiment are in direct heat-conducting contact with the pair of adjoining layers which are situated on both sides of each cooling foil. Thus, with this arrangement, the cooling effect is particularly good.

In the event that the insulation of the conductor is designed only for potentials encountered within one winding layer, which is to say one-half of the maximum potential between a pair of winding layers, then a construction as shown in FIG. 7 may be used. With this embodiment of my invention there is provided between a pair of adjoining winding layers a cooling foil 64 as was the case with FIG. 6, but in this embodiment there is also situated against each cooling foil 64 a thin insulating foil 65. As a result each cooling foil is electrically insulated with respect to one of a pair of adjoining layers between which the cooling foil is situated, while it is in direct heat-conducting relation with the other of the winding layers. Inasmuch as the insulation of the conductor can withstand the potential encountered within the winding layer itself, short circuiting within one winding layer through the electrically conductive cooling foil is not possible. The insulating foils 65 can be made, for example, of polyethyleneterephthalate and are made as thin as possible. The thickness of these insulating layers is chosen so that they will withstand the maximum potential encountered between adjoining layers.

With the embodiment of my invention which is illustrated in FIG. 8, each winding layer is cooled at both of its opposed faces, although the insulation of the conductor of any one winding layer is only capable of withstanding the potential encountered within the individual winding layer. With this embodiment a pair of cooling foils 64 and 66 are situated between each pair of adjoining winding layers, and this pair of cooling foils 64 and 66 are insulated from each other by an insulating foil 65 situated between the foils 64 and 66. Thus, the individual winding layers are insulated from each other and at the same time they are cooled at both of their exposed surfaces.

The cooling foils of FIGS. 6–8 are provided with the slots 67 extending from the foil tabs into the interior of the body of windings up to a location situated approximately midway between the opposed side edges of the foil from which the tabs thereof project. As is shown by the arrows in FIGS. 6–8, the refrigerating medium can flow through these slots into the interior of the body of windings. The foils are arranged with respect to each other in such a way that successive foils will have the slots thereof extending in different directions to the opposite sides of the body of windings, respectively, as indicated in FIGS. 6–8. In the event that the insulation of an individual conductor of a given winding layer is incapable of withstanding the maximum potential encountered within the winding layer, then both sides of the cooling foil must be provided with insulating foils.

Figure 9:
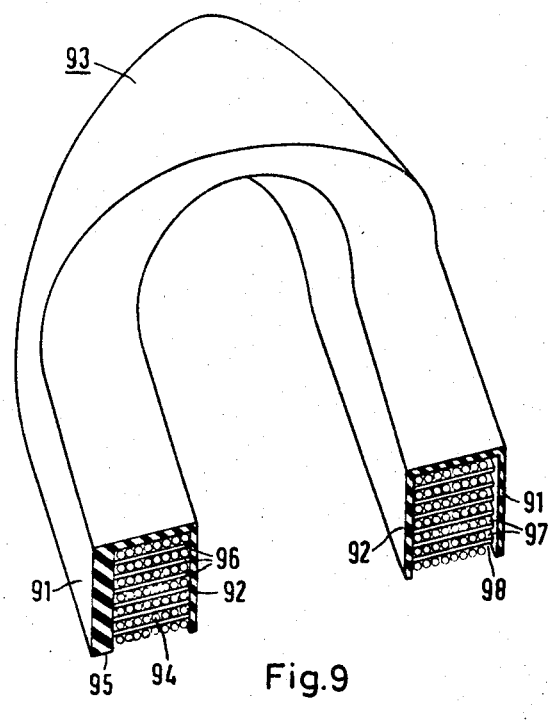
FIG. 9 schematically illustrates in a fragmentary, perspective, partly sectional view an embodiment of a saddle-shaped spool of my invention.

FIG. 9 illustrates in a perspective transverse view which is partly in section, a saddle-shaped spool according to my invention. A spool of this construction is particularly useful with magnetohydrodynamic generators. Between the opposed outer walls 91 and 92 of the spool carrier 93 is arranged the body of windings 94 composed of the several winding layers which are separated from each other by the heat-conducting cooling foils 96. The body of windings 94 in this embodiment is spaced only from the inner surface of the outer wall 91. In this embodiment the body of windings 94 is situated directly next to the opposed outer wall 92 of the spool carrier 93. The several spacer bodies 95 are thus situated only between the outer wall 91 of the spool carrier and the winding layers of the body of windings 94. These spacer bodies 95, however, are spaced from each other and uniformly distributed along the winding layers to define between themselves the spaces extending between the winding layers and the outer wall 91 of the spool carrier 93. The several cooling foils 96 are respectively provided along one of their side edges with the projecting tabs 97 which extend respectively into the spaces between the bodies 95. These spaces 98 between the bodies 95 are filled during operation of the spool with the refrigerating medium which thus has access to the tabs 97 situated in the spaces 98. With the embodiment of FIG. 9, the cooling foils have the form of bands or tapes of a configuration corresponding to that of the individual winding layers. In the event that the spool carrier 93 is made of metal, it is electrically insulated with respect to the body of windings 94.

My invention can of course be used with other types of spools where the spool carrier has opposed outer walls between which the winding layers are located.

With relatively simple cylindrical spools two sets of spacer bodies will normally be situated between the opposed outer walls of the spool carrier and the outer windings of the winding layers with the tabs of the cooling foils projecting into all of the spaces between the spacer bodies. With spools having small windings where cooling at the region of only one outer wall of the spool carrier is sufficient, or with spools where it is, for example, necessary to save material, it is of advantage to arrange only one set of spacer bodies between only one of the outer walls of the spool carrier and the spool windings with the tabs of the cooling foils projecting from only one side edge of the foils into the spaces between the spacer bodies, while the opposed outer windings of the winding layers are situated directly next to the other outer wall of the spool carrier. Such constructions are useful, for example, where the spools are assembled from a plurality of components, where the spools are divided in a Helmholtz arrangement, or where the spools have a saddle-shaped configuration as shown in FIG. 9. Spools of this latter type will, for example, closely surround the pipe of a magnetohydrodynamic generator.

The spacer bodies of the spool of my invention provide a stable lateral limiting support for the winding layers of the body of windings. The spools of my invention, therefore, have the advantage of being easily wound simply and quickly. In particular, it is possible with the spools of my invention to have machine wound winding layers. In addition, during operation of the spool, the body of winding layers remains stable and fixed. The spacer bodies are capable of absorbing forces encountered at the body of winding layers in the case where, for example, an arrangement of two or more spools is provided to achieve field configurations of predetermined shapes, and the spacer bodies can also absorb forces encountered between ferromagnetic materials and the spools. Furthermore, the forces acting in certain spool configurations within the spool windings themselves and directed outwardly will be absorbed by the spacer bodies and will be transmitted to the stable spool carrier. Thus, with my invention the spools will provide a robust and stable construction for the superconductors.

Furthermore, the situation of the cooling foils between the winding layers with their tabs projecting into the spaces between the spacer bodies provides a good inner cooling of the body of windings without any appreciable undesirable influence on the packing factor. Thus, the spools of my invention have the advantages of a good mechanical stability and the possibility of simple manufacturing of the windings with the advantages of a good cooling of the body of windings and a sharp reduction of the current degradation.

Moreover, the spools of my invention lend themselves to various different forms such as, for example, the cylindrical form which can be used to achieve a homogeneous magnetic field extending in the direction of the spool axis or spools of ring or saddle-shaped configuration can be provided, the latter types of spools being particularly useful for magnetohydrodynamic generators. With the spools of my invention the opposed outer walls of the spool carrier will extend perpendicularly with respect to the surfaces of the individual winding layers.

The spacer bodies are insulated with respect to the winding layers and the cooling foils so as to prevent short circuits between the conductive components of the spool through the spacer bodies. These spacer bodies preferably are themselves made of an insulating material of relatively great strength such as, for example, hard plastics, polyester resins with glass fibers, epoxide resins, known polyethylene-terephthalate sold under the trade name of Mylar and Hostaphan, or similar materials. The spacer bodies are fixed to the spool carriers before the winding layers are assembled therewith. It has proved to be of advantage to cement or otherwise adhere the spacer bodies to the opposed outer walls of the spool carrier, these outer walls being made of a metal, particularly steel, or these opposed outer walls of the spool carrier can be made of a rigid plastic. It is not essential, however, that the spacer bodies be made of individual elements. Instead they can be formed or portions of the opposed outer walls of the spool carrier itself as in the embodiment of FIG. 9. They will then have the configuration of projections at the inner surfaces of the opposed outer walls of the spool carrier, in which case the opposed outer walls are formed at their inner surfaces with depressions for receiving the projecting tabs of the cooling foils, and of course in this case the spacer bodies will be separated from each other by the depressions. Such depressions can, for example, be machined into opposed outer walls of spool carriers of metal or plastic in the case where these outer walls are of sufficient thickness, so that the spacer bodies will remain between these depressions. Metallic spacer bodies must be insulated with respect ot the spool windings and the cooling foils by suitable insulating foils. Where the spacer bodies are made of insulating material, such additional insulation is not required.

In order to achieve a uniform cooling of the entire spool, the spacer bodies are uniformly spaced from each other along the outer windings of the several winding layers.

The cooling foils are made of a material of good thermal conductivity such as, for example, copper, aluminum, or silver. The foils can be arranged so as to have overlapping ends. Thus, in the case of transition of the spool to the normal conducting state, the foils will be capable of receiving the field energy and uniformly distributing it through the spool. In the case of cylindrical spools, the foils will have the form of closed cylinders. The thickness of the cooling foils depends upon the cross section of the superconductor used for the spool windings and the field energy of the spool. The foil should not be too thin, since they are to provide a good conduction of heat away from the windings and must not rise to too high a temperature when receiving the field energy, so that damaging of the spool upon transition thereof to the normal conducting state will be avoided. On the other hand, the foil should not be too thick, since an undesirable packing factor will result. For a superconducting wire of 0.25 mm. such as freely available on the market, the cooling foil will have a thickness on the order of 10 to 50μ. For superconductors of larger diameter, correspondingly thicker foils will be used. Where a cable made up of a plurality of superconductors is used, as shown in FIG. 8, and where, for example, the cable is made up seven superconducting wires each having a diameter of 0.25 mm., the thickness of the foil will be on the order of 50–100μ. The foils are preferably made of metal of high purity so that the electrical resistance at the extremely low operating temperatures of the spool will be as low as possible.

In the event that during operation of the superconducting spool the transition into the normal conducting state releases magnetic field energy which is not transferred to the foils but instead is converted into an outer load, such as being coupled, for example, with a resistance or a capacitor, the cooling foil situated between the individual winding layers need not have the form of closed rings. With spools which are operated in this manner, instead of using closed endless foils, it is possible to use strip-shaped foils which are separated from each other and which have the projecting tabs extending into the spaces between the spacer bodies, or the foils can be arranged in such a way that their ends do not overlap.

The arrangement of slots in the cooling foils, as described above, provides during operation of the spool cooling of the interior of the body of windings from both sides of the body of windings. In this way an additional direct cooling of the individual winding layers is achieved by way of the refrigerating medium. Inasmuch as the slots extend approximately to a point situated midway between the opposed side edges of the foil from which the tabs thereof project, it is possible to retain for the foils the additional function of acting as a coupled short circuit to take over and distribute the field energy during transition of the spool to the normal state.

Instead of providing the foils with slots for the refrigerating medium, it is also possible to form in the foils openings to receive the refrigerating medium. However, care should be taken to see to it that the remaining area of the foils provided for cooling purposes does not become too small.

In the case where corrugated plastic spacer elements of insulating material are situated between the foil tabs in any one space between a pair of successive spacer bodies, as shown in FIGS. 3 and 4, these plastic corrugated spacer elements 34 or 45 can have a thickness, for example, of 0.1 mm., so that they are made in fact of corrugated plastic foil.

The superconductors used in the spools can take the form of superconducting wires or tapes of the most widely different type. Where a cable composed of individual superconductors is used, as shown in FIG. 8, a particularly good ratio between the thickness of the individual winding layers and the thickness of the cooling foil can be achieved, so that a very good packing factor can be provided. In the case of spools where the individual superconducting wires themselves form the winding layers, so that a cable type of winding is not used, in order to achieve a good packing factor it can be of advantage to situate the cooling foils not at each individual winding layer but rather between winding layers which do not adjoin each other, so that between each pair of cooling foils a plurality of winding layers are situated. If, for example, a pair of winding layers are situated next to each other between a pair of foils, a good cooling can still be achieved since each winding layer will be limited at one of its surfaces by a cooling foil.

The conductive metal coating in which the superconductor wire of the winding layers is encased and which remains in the normal conducting state during operation of the spool can, for example, be made of copper or silver. The insulation situated around these metal coatings is in the form of a thin insulated layer made, for example, of epoxy resin, nylon, or polyethylenterephthalate, and the thickness of the latter insulating layer is such that it does not provide too great of a resistance to the flow of heat to the cooling foils, while on the other hand it is capable of withstanding the electric potentials which are encountered. In the case of cables, as shown in FIG. 8, the individual conductors of the cable are not insulated from each other but instead the entire cable is surrounded by the insulation. The most dangerous potential in the spool is encountered at the place where the adjoining ends of a pair of successive winding layers are located, which is to say where one winding layer ends and the next starts. By the use of a suitable parallel connection of resistances, the potential can be maintained small enough so that the dielectric strength of the insulating layers of conventional superconductors is sufficient. Thus, it is not essential that the cooling foils of the spools of my invention be provided at their opposed faces with the thin layers of insulated material to electrically insulate them from the winding layers. By the full or partial elimination of the insulating foils between the cooling foils and the winding layers, the thermal conductivity between the cooling foils and the winding layers is improved and the efficiency of the cooling is increase.

In the case of FIG. 1, the metal mesh 20 which surrounds the entire body of windings and the spacer bodies 8 so that with this type of cylindrical spool the metal mesh extends between the opposed outer walls of the spool carrier, the metal mesh can be made of copper or stainless antimagnetic steel. In this way the windings and tabs of the cooling foils are protected against mechanical damage while on the other hand a free communication between the refrigerating medium and the body of windings and cooling foil tabs is not prevented. In the case of an arrangement as shown in FIG. 2 where a metal ring or band 26 is placed around the spacer bodies to protect the cooling foil tabs, this ring 26 can be made of copper and is of course formed with the openings or perforations 27 through which the refrigerating medium has free access to the spaces between the spacer bodies 21.

I claim:

1. A superconductive spool comprising a plurality of substantially coextensive winding layers situated adjacent each other and each having a pair of opposed outer windings and a plurality of intermediate windings situated therebetween, a spool carrier carrying said windings and having a pair of opposed outer walls respectively having inner surfaces facing said opposed outer windings of said layers, respectively, and at least one of said opposed outer walls of said spool carrier being spaced from said winding layers, a plurality of spacer bodies situated in the space between said one outer wall of said spool carrier and said layers and extending between said inner surface of said one outer wall of the spool carrier and said winding layers, said spacer bodies being spaced from each other and distributed along said winding layers so as to define between themselves spaces distributed along said winding layers between the latter and said one wall of said spool carrier and separated by said spacer bodies, and at least one heat-conducting foil situated between a pair of adjoining winding layers in thermally conductive relation with at least one of said pair of adjoining winding layers and having tabs projecting into said spaces defined between said spacer bodies to be engaged by a refrigerating medium situated in the latter spaces during operation of the spool for at least partly cooling the spool during operation thereof.

2. A spool as recited in claim 1 and wherein said spacer bodies are in the form of independent elements fixed to said spool carrier.

3. A spool as recited in claim 2 and wherein said spacer bodies are made of an insulating material.

4. A spool as recited in claim 1 and wherein said spacer bodies are integral with said one outer wall of said spool carrier and form projections thereof.

5. A spool as recited in claim 1 and wherein said spacer bodies are uniformly distributed along said winding layers.

6. A spool as recited in claim 5 and wherein said spool carrier includes an inner tubular wall surrounded by said winding layers, said winding layers being of cylindrical configuration and said opposed outer walls of said carrier being of a ring-shaped configuration and both being spaced from said opposed outer windings of said layers with said spacer bodies situated between said inner surfaces of both of said outer walls of said spool carrier extending between both of said outer walls and said outer windings of said layers, said spacer bodies having the configurations of sectors of a circle and said foil having tabs projecting into the spaces between all of said spacer bodies beyond both of said outer windings of said layers.

7. A spool as recited in claim 5 and wherein said spool carrier includes an inner tube surrounded by said winding layers, said layers being of cylindrical configuration and said carrier having ring-shaped outer walls both of which are spaced from said layers, said spacer bodies being situated between the inner surfaces of both of said outer walls and said outer windings of said layers and each spacer body having a pair of opposed end surfaces each extending along an involute of a circle along which the innermost winding layer of smallest radius extends, said foil having tabs projecting beyond both of said opposed outer windings of layers into all of the spaces between said spacer bodies.

8. A spool as recited in claim 5 and wherein said spool carrier has an inner tubular wall surrounded by said winding layers, said winding layers being of cylindrical configuration and said carrier having ring-shaped outer walls both of which are spaced from said outer windings of said layers with said spacer bodies situated between both of said outer walls and said winding layers and each having a pair of opposed end surfaces which in cross action extend along a circle whose radius is equal to the distance between the point of engagement of one end of one spacer body with said inner tubular wall and the corresponding point of engagement of an end of the next spacer body with said inner wall, said foil having tabs projecting beyond said outer windings of said layers into all of the spaces between said spacer bodies.

9. A spool as recited in claim 1 and wherein said foil has a pair of opposed side edges beyond one of which said tabs project into said spaces between said spacer bodies, and said foil being formed with slots respectively extending from said tabs to a point situated substantially midway between said opposed side edges of said foil.

10. A spool as recited in claim 9 and wherein both of said outer walls of said spool carrier are spaced from said layers with spacer bodies situated between both of said outer walls and said layers, and a plurality of said foils being situated between pairs of adjoining layers and having tabs projecting into all of said spaces, the slots of one of said foils extending from the tabs situated between said one outer wall of said spool carrier and said winding layers to said point substantially midway between said edges of said foil and the slots of the next foil extending from the tabs in the spaces between the other of said outer walls of said spool carrier and said winding layers to a point substantially midway between said opposed side edges of the latter foil.

11. A spool as recited in claim 1 and wherein said tabs are of substantially rectangular configuration and have a length slightly less than the thickness of said spacer bodies and a width slightly less than the distance between successive spacer bodies.

12. A spool as recited in claim 1 and wherein a plurality of said foils are situated between pairs of adjoining winding layers and have tabs projecting into said spaces between said spacer bodies, and spacer elements of insulating material situated between the foil tabs in each space between successive spacer bodies.

13. A spool as recited in claim 1 and wherein each winding layer is composed of a superconductor encased within a metal coating of good conductivity and having an insulating layer covering said metal coating.

14. A spool as recited in claim 13 and wherein said superconductor is in the form of a cable made up of a plurality of superconducting wires.

15. A spool as recited in claim 13 and wherein an insulating foil is situated next to and in engagement with said heat-conducting foil.

16. A spool as recited in claim 13 and wherein a pair of said heat-conducting foils are situated between said adjoining winding layers and wherein a thin insulating foil is situated between said pair of heat-conducting foils.

17. A spool as recited in claim 1 and wherein a metal mesh surrounds said winding layers.

18. A spool as recited in claim 1 and wherein a metal ring surrounds said spacer bodies and is formed with openings through which the refrigerating medium communicates with said spaces between said spacer bodies.

References Cited

UNITED STATES PATENTS

| | | | |
|---|---|---|---|
| 981,690 | 1/1911 | Rhodes | 336—61 |
| 2,592,817 | 4/1952 | McKechnie | 336—61 |
| 3,293,009 | 12/1966 | Allen et al. | 335—216 |

LEWIS H. MYERS, *Primary Examiner.*

T. J. KOZMA, *Assistant Examiner.*

U.S. Cl. X.R.

336—61, 206; 335—216